Oct. 17, 1950

K. MIHARA 2,526,256

CONDUCTOR REEL

Filed March 22, 1947

INVENTOR
Kazuo Mihara
BY
Bean, Brooks, Buckley & Bean.
ATTORNEYS

Patented Oct. 17, 1950 2,526,256

UNITED STATES PATENT OFFICE 2,526,256

CONDUCTOR REEL

Kazuo Mihara, Buffalo, N. Y.

Application March 22, 1947, Serial No. 736,546

3 Claims. (Cl. 242—107)

This invention relates to reel devices, and more particularly to an improved reel for electrical conductors and the like.

One of the objects of the invention is to provide an improved reel for electrical conductors, which is especially designed so as to be of improved structural simplicity and adapted for manufacture as a complete sub-assembly to be mounted with improved facility upon electrical instrument panels, or interiorly of electrical instrument casings or radio cabinets, or the like.

Another object of the invention is to provide a reel device of the character described, which embodies a spring re-wind and ratchet control mechanism of improved form.

Another object of the invention is to provide a reel device embodying the features aforesaid and which incorporates a mounting bracket structure of improved design, whereby substantial economies in cost of manufacture may be effected.

Another object of the invention is to provide a reel device of the character aforesaid which is constructed in improved manner so as to be adapted for use with improved facility as an accessory unit in electrical instruments and radio cabinets and the like.

Another object of the invention is to provide in a self-winding reel device an improved re-wind control mechanism.

Another object of the invention is to provide an improved reel of the character described whereby all of the features recited hereinabove are provided in the form of a unit accessory which is adapted to be mounted upon a singly apertured portion of an instrument panel or the like in improved manner; the re-wind control means thereof being extended through the mounting portion of the reel unit for control manipulation by the operator from exteriorly of the unit.

Other objects of the invention will appear from the specification hereinafter.

The drawings illustrate one example of the form in which the invention may be expressed; and show a reel device such as may be employed in conjunction with electrical testing apparatus or the like. Hence, the drawing illustrates a reel of the invention mounting a single conductor with a squeeze clamp terminal; although it will of course be understood that the invention is equally applicable to reel devices for duplex or multiplex conductors carrying any other type of terminal devices.

Figures 1, 2, 3:
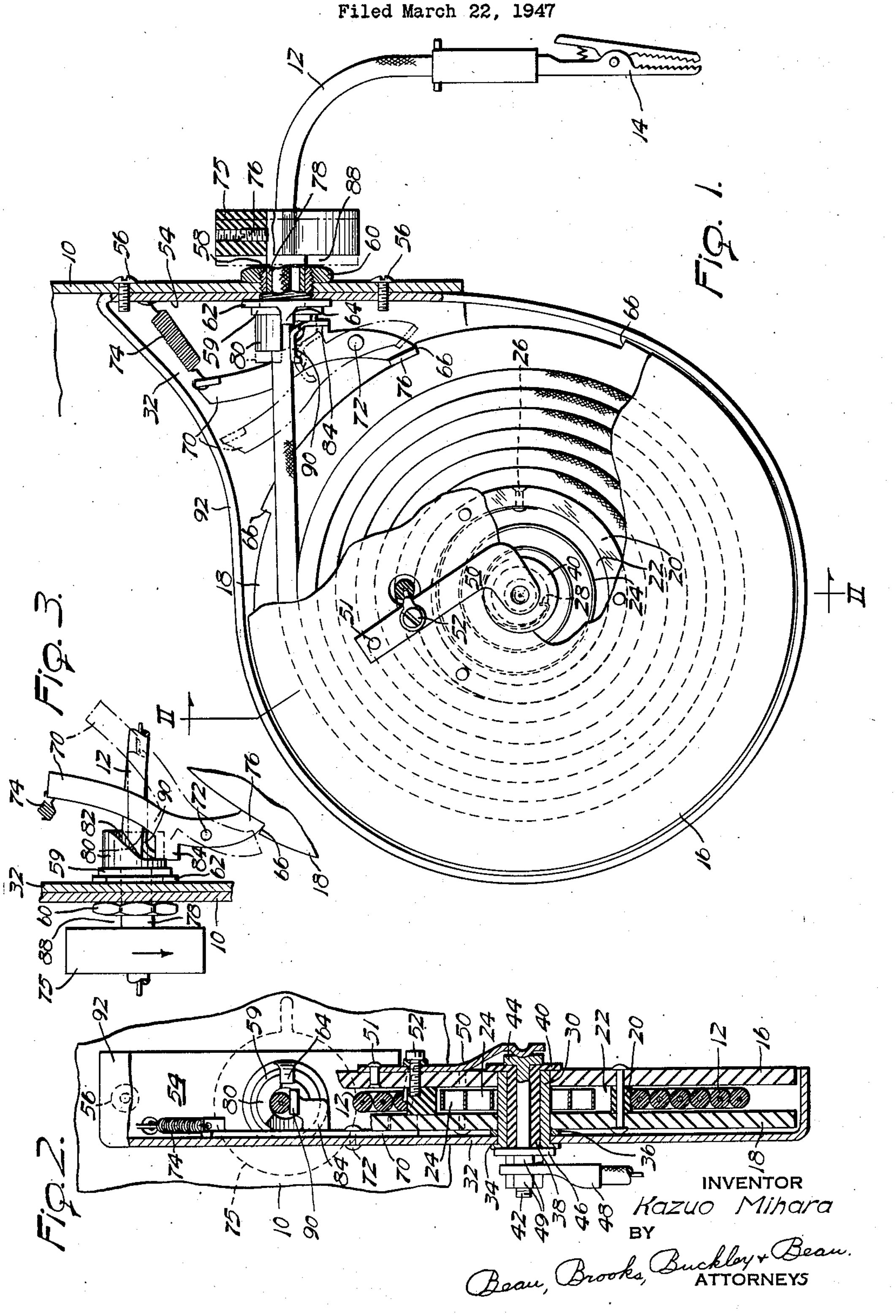
Fig. 1 is a side elevational view of a reel of the invention as described hereinabove, with a portion of the reel flange broken away, and showing a portion of a mounting instrument panel in section with the reel unit mounted thereon.
Fig. 2 is a section as along line II—II of Fig. 1.
Fig. 3 is a fragmentary opposite side elevational view of the re-wind control mechanism of the unit.

In the drawings, the reel unit of the invention is illustrated as being mounted upon a panel plate 10 which may comprise any casing portion or instrument panel or the like in any electrical testing equipment or cabinet in which it is desired to mount an extensible conductor such as is indicated at 12. In the drawing the conductor 12 is shown as carrying a pincher clamp terminal 14 such as is adapted to be manually operable to clamp upon another bared conductor or bus bar or battery terminal or the like in connection with electrical equipment testing operations. Thus, the conductor 12 comprises a lead having electrical connection interiorly of the cabinet casing, such as with a voltmeter or other testing instrument or the like carried within the casing 10. Thus, whenever it is desired to take readings from another conductor as referred to hereinabove, the instrument cabinet may be rested upon some suitable and conveniently located support and the conductor 12 pulled upon so that it feeds from the cabinet to permit the clamp 14 to be attached to the conductor to be tested.

The conductor reeling mechanism comprises a wheel consisting of spaced side plates 16—18 joined together by means of a central hub 20 which is of annular form so as to provide a chamber 22 interiorly of the reel. A clock-type spring 24 is carried within the chamber 22, and one end of the spring is fixed as at 26 to the hub 20 while the other end of the spring is inserted, as indicated at 28, into a bearing sleeve 30 which is slip-fitted through an apertured portion of a mounting bracket plate 32. The sleeve 30 is keyed to the plate 32 against rotation with the reel, and the sleeve 30 is formed with a flange 34 behind the bracket plate 32 to position the sleeve relative to the bracket in one direction. A bearing washer 36 is carried by the sleeve 30 to space the bracket plate 32 from the reel plate 18.

An insulative sleeve 38 is slip-fitted within the bearing sleeve 30 and is formed with an end flange 40 which engages the outer side of the reel plate 16. A bolt 42 slip-fits through the sleeve 38 and is formed of electrical conductive material and is headed, as at 44, at its inner end. An insulative washer 46 is disposed against the opposite end of the sleeve 38 and an electrical conductor terminal 48 is locked to the bolt 42 by means of lock nuts 49—49. A contact spring 50 is bolted to the reel plate 16, as indicated at 51—52 so as to extend therefrom in cantilever fashion to bear at its other end in electrical contact relation against the head of the bolt 42; and the inner end of the conductor 12 is led through a small aperture in the reel plate 16 and thence to the terminal bolt 52. Thus, it will be understood that the conductor 12 is at all times in electrical connection with the conductor 48 and that the conductor 48 will in turn be connected to the instrument which is mounted within the cabinet, according to the purpose thereof.

The bracket plate 32 is especially shaped so as to extend diagonally forwardly and upwardly as viewed in Fig. 1 from the position of its mounting of the reel pin 42, and terminates at the upper end with a right angle flange 54 which is formed at a vertical attitude for bolting against the inner wall of the casing plate 10, as by means of screws 56 or the like. The bracket flange 54 is bored to receive an externally threaded nipple 58 therethrough, the nipple 58 having a flange 59 at its inner end and a lock nut 60 is threaded upon its outer end. Thus, when the casing panel 10 is drilled to receive the nipple 58, the reel unit may be assembled upon the panel 10 by simply slip-fitting the nipple 58 through the panel opening and threading the lock nut 60 down against the panel 10. The screws 56 are simultaneously applied to complete the mounting of the unit. A collar 62 is first slip-fitted upon the nipple 58 so as to be disposed between the flange 59 and the bracket flange 54 when the unit is in assembled relation, and the collar 62 is formed with a radially extending stop finger 64 for a purpose which will be explained hereinafter.

As explained hereinabove, the clock spring 24 is arranged within the reel device in such manner as to tend at all times to rotate the reel in counter clockwise direction as viewed in Fig. 1, for purposes of rewinding the conductor 12 upon the reel whenever the conductor is not in use. However, to avoid pulling upon the conductor 12 by the spring 24 during such periods when the conductor is in extended operative position, the reel side plate 18 is provided with a ratchet tooth formation peripherally thereof so that abutments 66 are provided at intervals around the outer edge of the reel plate 18. A ratchet pawl device 70 is pivotally mounted as at 72 upon the bracket plate 32 and a tension spring 74 is connected between the upper end of the pawl 70 and the bracket plate so as to normally bias the bottom end 76 of the pawl into bearing relation against the edge of the reel plate so that it normally falls into the recesses ahead of the abutment portion 66 on the reel. Thus, the ratchet pawl arrangement freely permits unwinding of the conductor from the reel but operates automatically upon commencement of reverse rotation of the reel to block the latter so that tension upon the extended conductor will be relaxed.

To permit the spring 24 to operate to rewind the conductor 12 subsequent to completion of a testing operation or the like, a ratchet release knob 75 is keyed as indicated at 76 to the outer end of a sleeve 78 which fits through the hollow interior of the nipple 58. At its inner end the sleeve 78 is formed with an enlarged head 80 which is cam-shaped at its inner face 82 (Fig. 3) and disposed in alignment with a boss portion 84 which extends from the ratchet pawl 70 at a position above the pawl pivot 72. Thus, it will be understood that rotation of the knob 75 will cause the cam face portion 82 of the head 80 to rotate relative to the pawl boss 84 in such manner that the latter will be displaced from its normal attitude as indicated by solid lines in Fig. 1, and against the action of the spring 74 toward the broken line position of the pawl as shown in Fig. 1. Thus, the reel device will be released for automatic rewinding of the conductor 12 in response to the forces of the spring 24.

Thus, this mode of operation of the ratchet release mechanism is particularly adapted for use in instances where it is preferred to employ rotative movements for releasing the reel ratchet; and it will be understood of course that the knob 75 may be either rotated manually or geared to some other rotation producing mechanism; as may be preferred. In any case, it is a particular feature of the invention that rotative movements of the knob 75 are transmitted through the singly apertured portion of the panel 10 and of the bracket plate 54; while the conductor 12 also slip-fits through the same aperture but is guided through the interior of the rotating knob mechanism so as to be protected thereby against abrasion damage incidental to extension-retraction movements of the conductor. The cam head 80 and the stub finger 64 are so constructed and relatively arranged that they cooperate to limit the rotative movements of the cam head.

In other instances of application rotative type control movements of the knob 75 may be less preferred, whereas a simple axial displacement motion of the control knob 75 will suit the installation requirements to better advantage. In such case and for such purposes the control knob 75 is set upon the sleeve 78 so as to normally leave a space 88 between the rear face of the knob 75 and the lock nut 60; whereby the knob 75 may be simply pushed against so as to displace it to the left as viewed in Fig. 1 whereupon the cam head 80 will be similarly displaced to force the pawl to release the ratchet. Thus, it will be appreciated that by reason of this feature of the invention the mechanism comprises a universally applicable conductor reel and ratchet release mechanism which embodies unusual versatility in function while being at the same time to utmost structural simplicity.

In some instances of use, it may be found preferable to provide in conjunction with the ratchet release mechanism a means for retarding returning motion of the conductor 12 in the region of its passage through the mounting bracket aperture, so that the returning movement of the conductor will not overrun the rewinding motion of the reel such as would enable the conductor to "jump" the reel and thereby become entangled. In such case the pawl device 70 may be formed with a brake shoe 90 which comprises a bent finger portion of the ratchet member and is disposed so as to press upwardly against the conductor 12 and to squeeze the latter upwardly against the inner bore of the cam head 80 when the pawl 70 is in its reel blocking position, as shown in solid lines in the drawing. Thus, instantaneously upon latching of the reel against rewinding rotation, the friction brake mechanism will be applied against the conductor 12 so as to simultaneously hold the latter against overrunning relative to the reel. I prefer to arrange the brake shoe piece 90 to be somewhat resilient or "springy," so as to provide a smoother lock release operation.

Another form of conductor control means for preventing "jumping" of the conductor off the reel during rewinding operations is indicated at 92 in the drawing to comprise a flange which may be stamped integral with the bracket plate 32 to extend laterally therefrom so as to substantially encompass the periphery of the reel. Thus, this flange device 92 is arranged to prevent the conductor from "climbing" off the reel under any condition of operation, and the flange simultaneously functions as a bracket stiffening means for bracing the flange plate 32 against lateral deflections. It will be understood of course that the entire bracket plate and flange structure may be economically stamped from a single sheet of metal or the like; and also that the bracket device may be constructed so that the mounting flange portion 54 thereof extends at any desired angle from the plane of the plate 32 so that the reel device will be disposed at any desired angle relative to the mounting panel 10. Thus, the reel need not necessarily be disposed to extend at right angles to the mounting panel as shown in the drawing herein, but may be disposed to extend at any angle therefrom such as best suits the particular installation.

Another important feature of the invention is that although the reel mounting bracket comprises only a side plate and front flange of relatively small dimensions whereby an overall light weight construction is obtained in combination with important economies in overall size of the unit and cost of manufacture thereof, the bracket device serves to mount both the reel and the ratchet release mechanism while at the same time providing an improved conductor outlet portal. More specifically, the conductor outlet portal is disposed in approximate alignment with the average position of take-off of the conductor from the reel. Hence, flexing of the conductor incidental to winding and unwinding operations is minimized, and the conductor is given maximum protection by the conductor outlet portal against abrasion damage or the like.

It will be understood that although only one form of the invention has been shown and described in detail, it will be apparent to those skilled in the art that the invention is not so limited but that various changes may be made therein without departing from the spirit of the invention or the scope of the appended claims.

What is claimed is:

1. A reel device comprising a bracket, a winding reel rotatably mounted upon said bracket, spring means interconnecting said bracket and said reel for biasing the latter to rotate in one direction, a ratchet pawl device carried by said bracket and geared to said reel for blocking the latter against rotation in response to the action of said spring means, a conductor outlet aperture formed through said bracket in approximately tangential alignment with said reel, a ratchet release mechanism comprising a sleeve rotatably mounted upon said bracket apertured portion and extending therethrough and operable from exteriorly thereof to actuate said ratchet pawl to release said reel, and a conductor wrapped upon said reel and training therefrom through said sleeve.

2. A reel device comprising a bracket, a winding reel rotatably mounted upon said bracket, spring means interconnecting said bracket and said reel for biasing the latter to rotate in one direction, a ratchet pawl device carried by said bracket and geared to said reel for blocking the latter against rotation in response to the action of said spring means, a conductor outlet aperture formed through said bracket, and a ratchet release mechanism comprising a hollow shaft mounted upon said bracket apertured portion and extending therethrough and having a cam surface at its inner end operable in response to rotational movements of said shaft to actuate said ratchet pawl to release said reel, said shaft being apertured therethrough to permit a conductor to be fed from said reel through said shaft.

3. A reel device comprising a bracket, a winding reel rotatably mounted upon said bracket, spring means interconnecting said bracket and said reel for biasing the latter to rotate in one direction, a ratchet pawl device carried by said bracket and geared to said reel for blocking the latter against rotation in response to the action of said spring means, a conductor outlet aperture formed through said bracket, and a ratchet release mechanism comprising a hollow shaft mounted upon said bracket apertured portion and extending therethrough and having a cam surface at its inner end operable in response to rotational movements of said shaft to actuate said ratchet pawl to release said reel, said shaft being apertured therethrough to permit a conductor to be fed from said reel through said shaft, and a brake shoe element carried by said ratchet pawl device and movable therewith to bear frictionally against said conductor whenever said pawl device is in reel locking position.

KAZUO MIHARA.

REFERENCES CITED

The following references are of record in the file of this patent:

UNITED STATES PATENTS

| Number | Name | Date |
|---|---|---|
| 706,697 | Sims | Aug. 12, 1902 |
| 2,393,138 | Borkoski | Jan. 15, 1946 |
| 2,393,417 | Ruttkay | Jan. 22, 1946 |
| 2,428,446 | Beede | Oct. 7, 1947 |